June 8, 1926.
A. W. BURKS
1,588,009
POWER TRANSMITTING MECHANISM
Original Filed Feb. 7, 1919    2 Sheets-Sheet 2
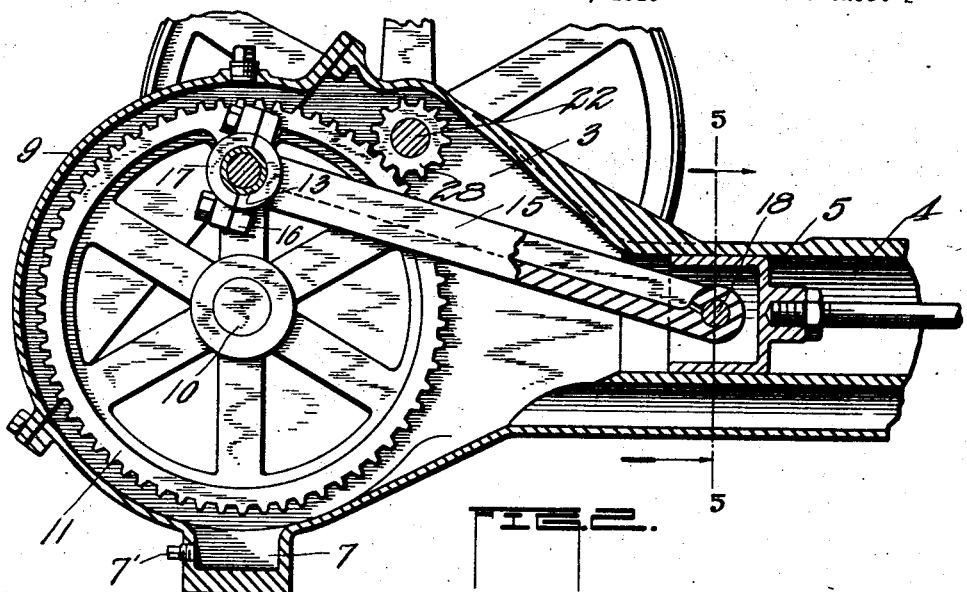
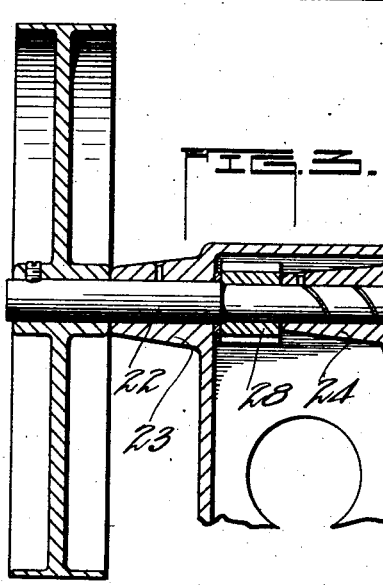
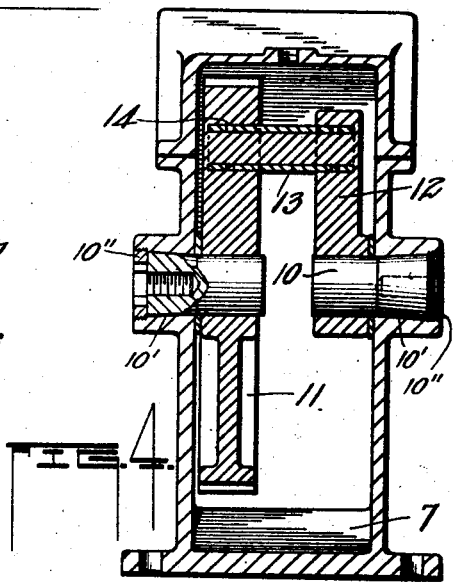
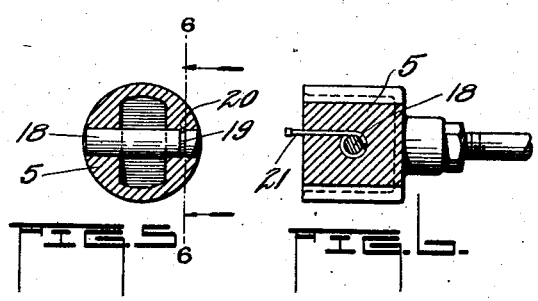
INVENTOR.
Arthur W. Burks.
by George T. Bean.
ATTYS Patented June 8, 1926.

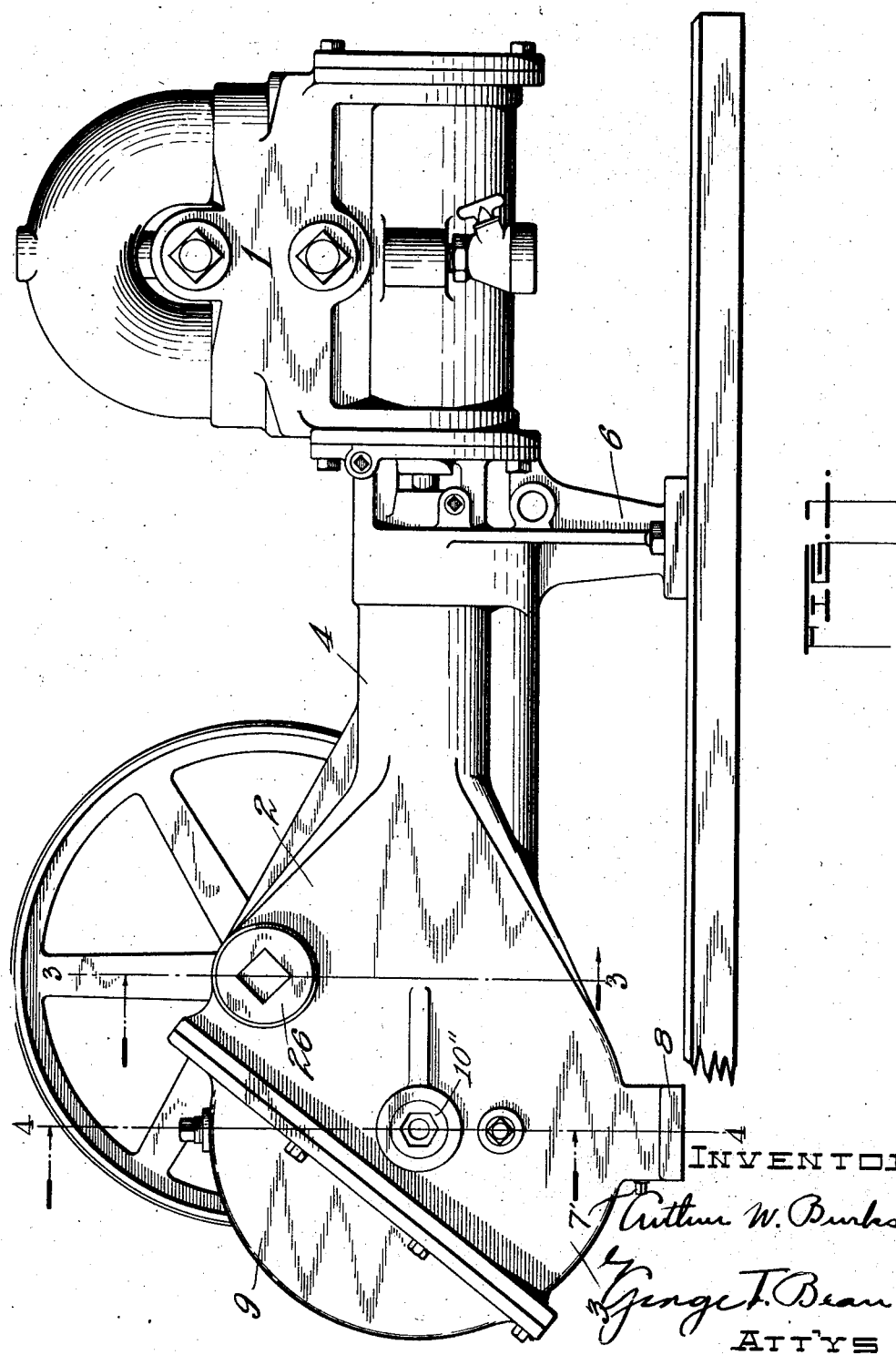

1,588,009

UNITED STATES PATENT OFFICE.

ARTHUR W. BURKS, OF DECATUR, ILLINOIS, ASSIGNOR, BY MESNE ASSIGNMENTS, TO THE DEMING COMPANY, OF SALEM, OHIO, A CORPORATION OF OHIO.

POWER-TRANSMITTING MECHANISM.

Application filed February 7, 1919, Serial No. 275,577. Renewed October 7, 1924.

This invention relates to power transmitting mechanism.

It is particularly applicable for use with power driven pumps although not limited to such use.

One of the objects of the invention is to provide an improved power transmitting mechanism.

Another object is to provide for improved lubrication of power transmitting mechanism.

Another object is to provide an improved enclosed power transmitting mechanism.

Another object is to provide power transmitting mechanism which is readily accessible for examination and repair.

Another object is to provide power transmitting mechanism which is simple and strong in construction and reliable in operation.

Other objects and advantages will appear from the specification and claims.

To the accomplishment of the foregoing and such other objects as may hereinafter appear, my invention consists in the construction, combination and arrangement of parts hereinafter described, and then sought to be defined in the appended claims, reference being had to the accompanying drawings forming a part hereof, and which show, merely for the purpose of illustrative disclosure, a preferred embodiment of my invention, it being expressly understood that various changes may be made in practice within the scope of the claims without digressing from my inventive idea.

In the drawings:—

Fig. 1 represents a view in side elevation of a pumping unit constructed to embody this invention.

Fig. 2 represents a view in vertical longitudinal section of the crank case, operating parts and cross head.

Fig. 3 represents a view in transverse section of the crank case, taken substantially on line 3—3 of Fig. 1.

Fig. 4 represents a view in transverse section of the crank case, taken substantially on line 4—4 of Fig. 1.

Fig. 5 represents a view in transverse section of the cross head, taken substantially on line 5—5 of Fig. 2, to show the locking means for the cross head pin.

Fig. 6 represents a view in section of the cross head, taken substantially at right angles to Fig. 5 and on line 6—6 therein.

The pump itself forms no part of the present invention and is shown in Figure 1 to indicate the relation of the parts to be hereinafter described. It is designated by the numeral 1 and is connected to the crank and gear case 2, as shown in Figure 1 of the drawing.

This case 2 is formed with the enlarged portion 3 to receive the operating gears and connecting rod and the reduced and extended portion 4 to receive and form a guide for the cross head 5, this reduced and extended portion being connected to the pump case as shown and having the support or foot 6 near its end to be fastened to a suitable base. The enlarged portion 3 is provided with the settling well 7, which forms on the outside thereof the supporting foot 8, also having the drain plug 7'. This portion 3 also has the removable cap plate 9 of sufficient size to permit the removal of the parts described later.

Mounted in the sides of the enlarged portion 3 of the case 2, so as to be stationary, are the studs or short shafts 10, the outer ends of which are tapered, as at 10', to form a close fit with the correspondingly sloped opening in the case and having the screw plugs 10'' for removably holding them in position. On these stationary studs or short shafts the large gear 11 and the crank disc or member 12 turn, the shafts having an oil tight fit in the case. The gear 11 and the crank disc or member 12 actually form an integral part or unit, being connected by the steel sleeve or tube 13, which is placed in the mold when the parts are cast, the molten metal filling the sleeve or tube so as to cause a close union between the parts, the sleeve or tube being provided with the apertures 14 to assist in the accomplishment of this purpose.

The sleeve or tube 13 forms the bearing or wrist pin for the connecting rod 15, the end of which is formed with the half bearing 16 and the cap 17 completing the bearing and connecting the rod 15 to the sleeve or tube 13. This connecting rod is secured to the cross head 5 by means of the pin 18, on which the connecting rod turns. This pin 18 is formed with the annular groove 19 which registers with a similar groove 20 formed in the cross head to receive the nail or other suitable securing means 21, which is driven thereinto and follows the groove around the pin 18, thereby securely locking it in place until the nail or other means is withdrawn. The connecting rod is hollowed out to reduce its weight and to provide a groove or channel to convey the lubricant to the cross head pin.

The main driving shaft 22 has one bearing 23 in the side of the case 2 and has its end journalled in the removable bearing member 24, which fits within the opening 25, being held in place therein by means of the plug 26. Pin 27 connects plug 26 to the bearing member 24, so that as the plug is screwed into position, the bearing member is moved into position and held there against rotating. Drive pinion 28 is secured on shaft 22 and meshes with the large gear 11, as shown. The opening 25 is large enough to permit the ready removal of gear 28 and bearing 24 therethru.

The principal features are the simplicity and strength of the construction, the accessibility of the parts, the entire enclosing of the mechanism, and the readiness with which it may be taken apart. This only involves the removal of the cap plate or cover 9, the bearing cap 17, the studs or short shafts 10, and disconnecting the piston. Then all of the operating parts may be removed through the opening left by the removal of the cap or cover plate 9.

Having described my invention, what I claim is:—

1. A mechanism of the character described, including in combination, an enclosing casing, a pair of short shafts extending inwardly from the opposite sides of said casing and secured against rotation, the inner ends of said shafts being spaced apart, a gear journaled to rotate on one of said shafts, a crank member journaled to rotate on the other of said shafts, a wrist pin connecting said crank member and said gear, and means for driving said gear.

2. A mechanism of the character described, including in combination a casing having an opening in each side thereof, a pair of short shafts positioned in said openings, each shaft having an expandingly tapered end fitting in said opening and a plug for forcing each shaft into its opening and holding it therein, said shafts being fixed with respect to said casing and their inner ends being spaced apart, a gear journaled to rotate on one of said shafts, a crank journaled to rotate on the other of said shafts, a wrist pin connecting said crank and said gear, and means for driving said gear.

3. A mechanism of the character described including in combination a casing, said casing having a journal provided for a driving shaft in one side thereof and having an enlarged opening opposite said journal, a driving shaft journaled in said journal and having a driving pinion secured thereto, a removable bearing member for the end of said driving shaft and positioned in said enlarged opening, a plug for holding said removable bearing member in position, said opening being greater in diameter than said bearing member and said pinion, whereby the shaft may be removed bodily thru said opening, and means on said plug to prevent rotation of said bearing member.

4. A mechanism of the character described, including in combination, a casing having an enlarged portion and an extended portion, said extended portion being adapted to be connected to a pump head casing and having a cross head slidable therein, said enlarged portion of the casing having a removable cap plate, a drive shaft journaled in said enlarged portion of the casing, and having a pinion thereon, a pair of short shafts secured to the opposite sides of the enlarged portion of the casing and extending thereinto with their inner ends spaced apart, a large gear journaled on one of said shafts and meshing with said pinion, a crank member journaled on the other of said shafts, a wrist pin connecting said crank member and said large gear, and a connecting rod connecting said cross head to said wrist pin. these parts all being enclosed within said casing.

5. A mechanism of the character described, including in combination, an enclosed casing having an enlarged portion and a reduced extended portion, said reduced extended portion having a cross head mounted therein, a drive shaft journalled in said casing, one of the bearings therefor including a removable bearing member and a plug to hold said removable bearing member in position, an opening being provided in the side of the casing to receive these parts, a pinion on said drive shaft, a large gear and a crank member spaced apart and rotatably mounted within said casing and having a wrist pin connecting them, said gear meshing with said pinion, and a connecting rod for connecting said cross head to said wrist pin.

6. A mechanism of the character described, including in combination, an enclosed casing having an enlarged portion and a reduced extended portion, said reduced extended portion having a cross head mounted therein, a drive shaft having a fixed bearing in one side of said casing and journalled in a removable bearing in the other side of said casing, a pair of short shafts inserted from the outside of the opposite sides of the enlarged portion of said casing and having their inner ends spaced apart, a gear journalled on one shaft and a crank member journalled on the other shaft and a wrist pin connecting said gear and crank member, a connecting rod connecting said cross head to said wrist pin, and a pinion on said drive shaft meshing with said gear.

7. A mechanism of the character described, including in combination, an enclosed casing having an enlarged portion and a reduced and extended portion, a cross head mounted in said reduced and extended portion, a drive shaft journalled in the enlarged portion of said casing and having a pinion mounted thereon, said enlarged portion of said casing having a well formed in the bottom thereof, a large gear and a crank member spaced apart and mounted to rotate in the enlarged portion of said casing and having a wrist pin connecting them, said gear meshing with said pinion, and a connecting rod connecting said cross head to said wrist pin, said connecting rod being formed with a channel extending the length of its upper surface to its bearing in the cross head so as to convey the lubricant thereto.

8. A mechanism of the character described, including in combination, an enclosed casing having an enlarged portion and a reduced and extended portion, a cross head mounted to slide in said reduced and extended portion, a drive shaft journaled in the enlarged portion of said casing and having a pinion secured thereto, a gear journaled on one side of the enlarged portion of the casing, a crank journaled on the other side thereof, a wrist pin interconnecting said gear and said crank and forming therewith an integral structure, and a connecting rod connecting said wrist pin to said cross head.

9. A mechanism of the character described including in combination an enclosing casing having an enlarged and an extended reduced portion adapted to be connected to a pump, a cross-head mounted to slide in said reduced and extended portion, a drive shaft journaled in said enlarged portion of the casing and having a pinion secured thereto within the casing, a removable slip bearing for the drive shaft having a larger exterior than the pinion, a gear journaled within the enlarged portion of the casing and meshing with said pinion, and a connecting rod having an eccentric pivotal connection with said gear.

10. A mechanism of the character described including in combination an enclosing casing having an enlarged and an extended reduced portion adapted to be connected to a pump, a cross-head mounted to slide in said reduced and extended portion, a drive shaft journaled in said enlarged portion of the casing and carrying a pinion, a gear disposed within the casing and meshing with said pinion, and a connecting rod having an eccentric pivotal connection with said gear, said extended portion having a support formed integrally therewith and said enlarged portion also having a support formed integrally therewith.

11. A mechanism of the character described including in combination an enclosing casing having an enlarged and an extended reduced portion adapted to be connected to a pump, a cross-head mounted to slide in said reduced and extended portion, a drive shaft and a driven gear journaled in said enlarged portion of the casing, said drive shaft having a pinion secured thereto within the enlarged portion of the casing and meshing with said gear, and a connecting rod having an eccentric pivotal connection with said gear, said drive shaft being removable from said casing and the journal for said gear being removable from said casing.

12. A mechanism of the character described including in combination an enclosing casing having an enlarged portion and a reduced and extended portion, a cross-head mounted to slide in said reduced and extended portion, a drive shaft journaled in each side of said enlarged portion of the casing and having a pinion secured thereto within the casing, a connecting rod for said cross-head, and a gear and eccentric connection between said connecting rod and said pinion, said gear and eccentric connection being located at opposite sides of the casing and each being immediately adjacent the connecting rod.

13. A mechanism of the character described including in combination an enclosing casing having an enlarged portion and a reduced and extended portion, a cross-head mounted to slide in said reduced and extended portion, a drive shaft journaled in each side of said enlarged portion of the casing and having a pinion secured thereto within the casing, a connecting rod for said cross-head, and a gear and eccentric connection between said connecting rod and said pinion, said gear and eccentric connection being journaled in both sides of said enclosing casing by means of detachable bearings insertable from opposite sides.

14. A mechanism of the character described including in combination an enclosing casing having an enlarged portion and a reduced and extended portion, a cross-head mounted to slide in said reduced and extended portion, a drive shaft journaled in said enlarged portion of the casing and having a pinion secured thereto within the casing and a fly-wheel secured thereto without the casing, a gear positioned within the casing and on one side thereof, a connecting rod for said cross-head, said connecting rod having an eccentric pivotal connection with said gear, and externally removable bearings in opposite sides of the casing supporting said gear and eccentric connection.

15. A casing for a power transmitting mechanism having an enlarged portion and a reduced and extended portion, said enlarged portion having a removable cap plate of considerable size and constituting portions of the sides and tops of the casing to permit the removal of the parts adapted to be enclosed within the casing, said enlarged portion having a support formed integrally therewith and said reduced and extended portion also having a support formed integrally therewith.

16. A mechanism of the character described, including in combination an enclosing casing having an enlarged portion, a drive shaft extending through the enlarged portion and having a pinion secured thereto within the casing, a removable bearing for said drive shaft, a gear and eccentric connection positioned within said casing said gear being in mesh with said pinion, a connecting rod, and removable bearings in each side of said casing for said gear and eccentric connection.

17. A mechanism of the character described including in combination, an enclosing casing, a pair of bearing members extending inwardly from opposite sides of the casing, and secured against rotation, said bearing members aligned and their inner ends being spaced apart, a gear and an eccentric connection mounted on said bearing members, a cross-head, a pitman leading thereto from the eccentric connection, and a driving pinion meshing with said gear.

18. A mechanism of the character described including an enclosing casing, a pair of bearing members insertable from the opposite sides of the casing through openings therein and extending into the interior, said bearing members making an oil tight connection with the casing and closing said openings, a gear and an eccentric driving connection rotatably mounted with reference to said stationary bearing members, and means driven thereby.

19. A mechanism of the character described, including in combination an enclosing case, a pair of short shafts extending inwardly from opposite sides of the casing and secured against rotation, said shafts aligning and their inner ends being spaced apart, a pair of crank members, journaled on said shafts, a wrist pin connecting said crank members, one of said crank members being in the form of a disk having gear teeth on its periphery, a pinion meshing with said gear teeth and means for driving said pinion.

20. A mechanism of the character described, including in combination a casing, said casing having a journal provided for a driving shaft on one side thereof and having an enlarged opening opposite said journal, a driving shaft journaled in said journal and having secured to it a driving pinion smaller than said opening, a removable bearing member occupying said enlarged opening and forming a journal for said shaft, and means for locking the removable bearing member in position.

21. A mechanism of the character described, including in combination a casing, said casing having a journal provided for a driving shaft on one side thereof and having an enlarged opening opposite said journal, a driving shaft journaled in said journal and having secured to it a driving pinion smaller than said opening, a removable bearing member occupying said enlarged opening and forming a journal for said shaft, a gear meshing with the pinion and having its lower portion in oil in the casing, and means for feeding along the shaft oil raised by said gear to said pinion.

22. In a mechanism of the character described, the combination, with actuating devices of a driven mechanism including a gear, a casing surrounding said gear and having aligned apertures therein, detachable slip bearing members insertable in opposite sides of said casing and having cylindrical bearing portions extending into the interior and supporting the driven mechanism, said casing having an aperture large enough for the removal of said gear, and a hood adapted to cover said aperture.

23. A mechanism of the character described including in combination an enclosing casing, a driving pinion a gear meshing with the pinion and adapted to be immersed in oil in the casing, and a connecting rod located immediately adjacent the side of the gear, said connecting rod having a groove in its upper surface adapted to receive oil forced out of the upper portion of the gear by the pinion.

24. A mechanism of the character described including in combination an enclosing casing, a driving pinion, a gear meshing with the pinion and adapted to be immersed in oil in the casing, a cross-head, a wrist pin therein, a connecting rod between the gear and said wrist pin, said connecting rod having a groove in its upper surface leading to the wrist pin, said groove being adapted to receive oil forced out of the upper portion of the gear by the pinion.

In testimony whereof I hereunto subscribe my name.

ARTHUR W. BURKS.